US009250896B2

(12) United States Patent
Grimes et al.

(10) Patent No.: US 9,250,896 B2
(45) Date of Patent: *Feb. 2, 2016

(54) AUTOMATED SHUTDOWN METHODOLOGY FOR A TIERED SYSTEM

(71) Applicant: International Business Machines Corporation, Armonk, NY (US)

(72) Inventors: Christopher L. Grimes, Tucson, AZ (US); Gerard N. Kimbuende, Tucson, AZ (US); Rex R. Newton, Sahuarita, AZ (US); David J. Reich, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 26 days.

This patent is subject to a terminal disclaimer.

(21) Appl. No.: 14/062,797

(22) Filed: Oct. 24, 2013

(65) Prior Publication Data

US 2014/0189088 A1 Jul. 3, 2014

Related U.S. Application Data

(63) Continuation of application No. 13/733,833, filed on Jan. 3, 2013.

(51) Int. Cl.
*G06F 9/00* (2006.01)
*H04L 12/12* (2006.01)
*H04L 12/24* (2006.01)

(52) U.S. Cl.
CPC *G06F 9/00* (2013.01); *H04L 12/12* (2013.01); *H04L 41/0672* (2013.01); *Y02B 60/34* (2013.01)

(58) Field of Classification Search
CPC ....... G06F 9/00; H04L 12/12; H04L 41/0672; Y02B 60/34
See application file for complete search history.

(56) References Cited

U.S. PATENT DOCUMENTS

| 5,717,934 | A  | * | 2/1998  | Pitt et al. ................ 713/330 |
|-----------|----|---|---------|--------------------------------------|
| 6,304,981 | B1 | * | 10/2001 | Spears et al. .................. 714/24 |
| 6,892,311 | B2 | * | 5/2005  | Coppock et al. ............ 713/300 |
| 7,451,336 | B2 | * | 11/2008 | Manuell et al. ............. 713/324 |
| 7,721,213 | B2 | * | 5/2010  | Chidambaram et al. ...... 715/736 |
| 8,365,308 | B2 | * | 1/2013  | Rodgers et al. .............. 726/34 |
| 2002/0183869 | A1 | * | 12/2002 | Chaiken et al. ................ 700/79 |
| 2007/0088931 | A1 | * | 4/2007  | Osaki et al. .................. 711/173 |
| 2007/0233803 | A1 | * | 10/2007 | Stienhans ................... 709/208 |
| 2014/0189382 | A1 |   | 7/2014  | Grimes et al. |

OTHER PUBLICATIONS

"IBM Virtualization Engine TS7700 Series: Introduction and Planning Guide," IBM, pp. 1-324.
"IBM Virtualization Engine TS7700 Series z/OS Host Command Line Request User's Guide Version 2.1d," Oct. 2012, IBM Corporation, pp. 1-90.
U.S. Appl. No. 13/733,833 filed on Jan. 3, 2013.
(Continued)

*Primary Examiner* — Michael C Lai
(74) *Attorney, Agent, or Firm* — Zilka-Kotab, PC

(57) ABSTRACT

According to one embodiment, a method includes receiving, at a host, an instruction to execute a command that instructs at least one system at a site and in communication with the host via one or more fiber channels to each execute a script, the script being for automatically shutting down components of the at least one system in an order defined by the script, and issuing the command to the at least one system at the site via the one or more fiber channels.

20 Claims, 6 Drawing Sheets

(56) References Cited

OTHER PUBLICATIONS

Non-Final Office Action from U.S. Appl. No. 13/733,833, dated Apr. 3, 2015.

Notice of Allowance from U.S. Appl. No. 13/733,833, dated Sep. 21, 2015.

* cited by examiner

AUTOMATED SHUTDOWN METHODOLOGY FOR A TIERED SYSTEM

RELATED APPLICATIONS

This application is a continuation of U.S. patent application Ser. No. 13/733,833, filed Jan. 3, 2013, which is herein incorporated by reference.

BACKGROUND

The present invention relates to computing, systems, and more specifically, this invention relates to systems, methods and computer program products for implementing an automated shutdown of a tiered system.

Conventional computing systems, for example, enterprise applications, typically possess tiered architectures. Tiered systems are typically constructed from a collection of components that combine to implement high-performance computing applications. Each of the components in the tiered system may be a separate, independent computing device interconnected with the other components via a communication medium, such as a network.

Tiered systems provide specialized solutions catering to different business aspects within an organization or across geographically distant installations. These systems further enable enterprises to operate critical tasks (e.g. data storage, archiving business records, etc.) with reduced involvement and individual know-how of the end-users (e.g. customers).

Management of tiered computing systems to maintain architectural integrity and performance of the computing systems is critical for providing continuous business operations. In the course or managing a tiered computing system, a situation may arise that requires the shutdown of a component and/or the entire system. For example, a potential or actual emergency (e.g., an earthquake, flood, fire, etc) or other immediate crises a power outage) may warrant shutdown. Additionally, shutdown may be necessary when an individual component and/or node within the multi-tiered system reaches a thermal failure or is exposed to an unexpected environment (e.g., blocked vents, fan failures, lab cooling failures, etc.).

Typically, the shutdown of a tiered system is complex and must occur according to a specified sequence. Improper shutdown may have disastrous effects, some as severe as the loss of customer data and loss of configuration. Consequently, the shutdown of a tiered system is usually only performed by a certified human operator and thus may be limited to the human operator's response time.

BRIEF SUMMARY

In one embodiment, a method includes receiving, at a host, an instruction to execute a command that instructs at least one system at a site and in communication with the host via one or more fibre channels to each execute a script, the script being for automatically shutting down components of the at least one system in an order defined, by the script, and issuing the command to the at least one system at the site via, the one or more fibre channels.

In another embodiment, a method includes receiving, at a local system, a command from a host, executing a script on the local system in response to the command, the script being stored on the local system, wherein the script causes components of the local system to automatically shut down in an order defined by the script.

Other aspects and embodiments of the present invention will become apparent from the following detailed description, which, when taken in conjunction with the drawings, illustrate by way of example the principles of the invention.

DETAILED DESCRIPTION

Figure 1:
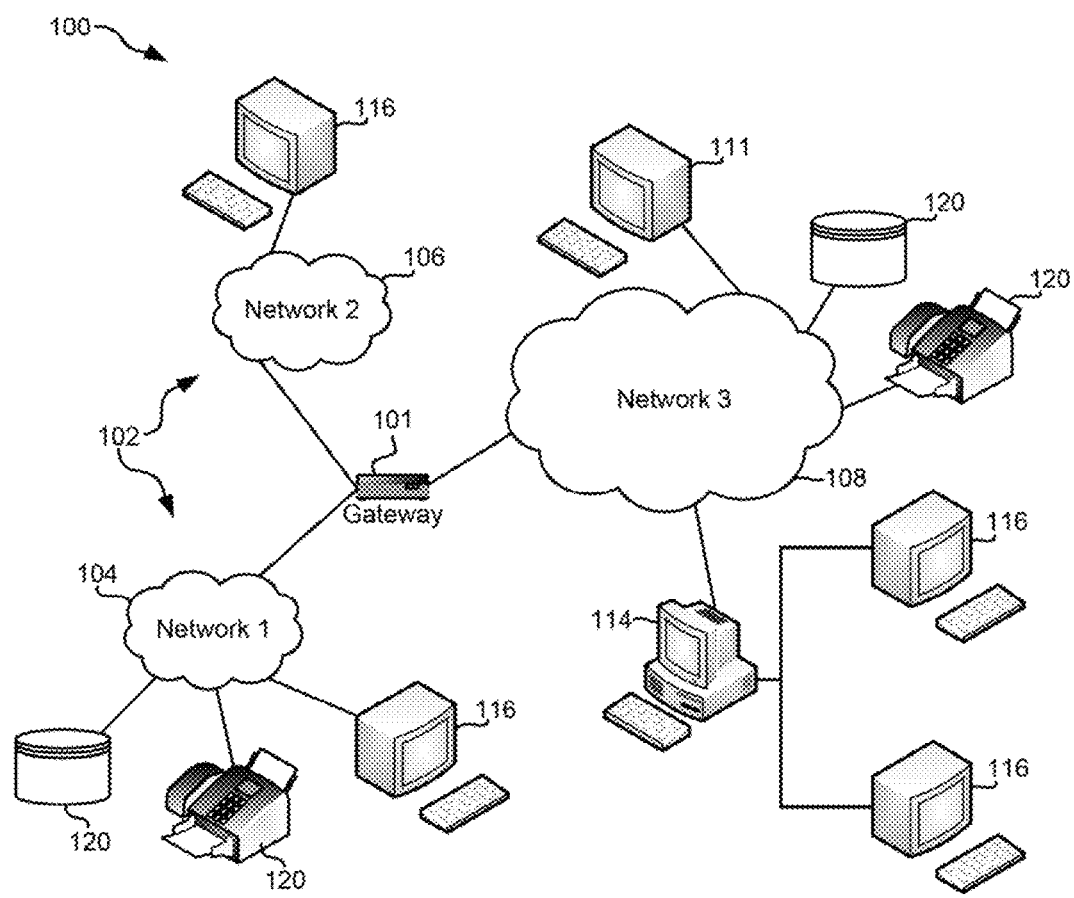
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a" "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for implementing an automated shutdown of a tiered system using a job control language (JCL) command or the like, and a fibre channel.

In one general embodiment, a method includes receiving, at a host, an instruction to execute a command that instructs at least one system at a site and in communication with the host via one or more fibre channels to each execute a script, the script being for automatically shutting down components of the at least one system in an order defined by the script, and issuing the command to the at least one system at the site via the one or more fibre channels.

In another general embodiment, a computer program product includes a computer readable storage medium having program code embodied therewith, the program code readable/executable by a processor to: receive, at a host, an instruction to execute a command that instructs at least one system at a site and in communication with the host via one or more fibre channels to each execute a script, the script being for automatically shutting down components of the at least one system in an order defined by the script, issue the command to the at least one system at the site via the one or more fibre channels.

In yet another general embodiment, a method includes receiving, at a local system, a command from a host, executing a script on the local system in response to the command, the script being stored on the local system, wherein the script causes components of the local system to automatically shut down in an order defined by the script.

As will be appreciated by one skilled in the art, aspects of the present invention ma be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (e.g., CD-ROM), a Blu-ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fibre, etc.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer, for example through the Internet using an Internet Service Provider (ISP).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart(s) and/or block diagram block or blocks.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 196 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein ma be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
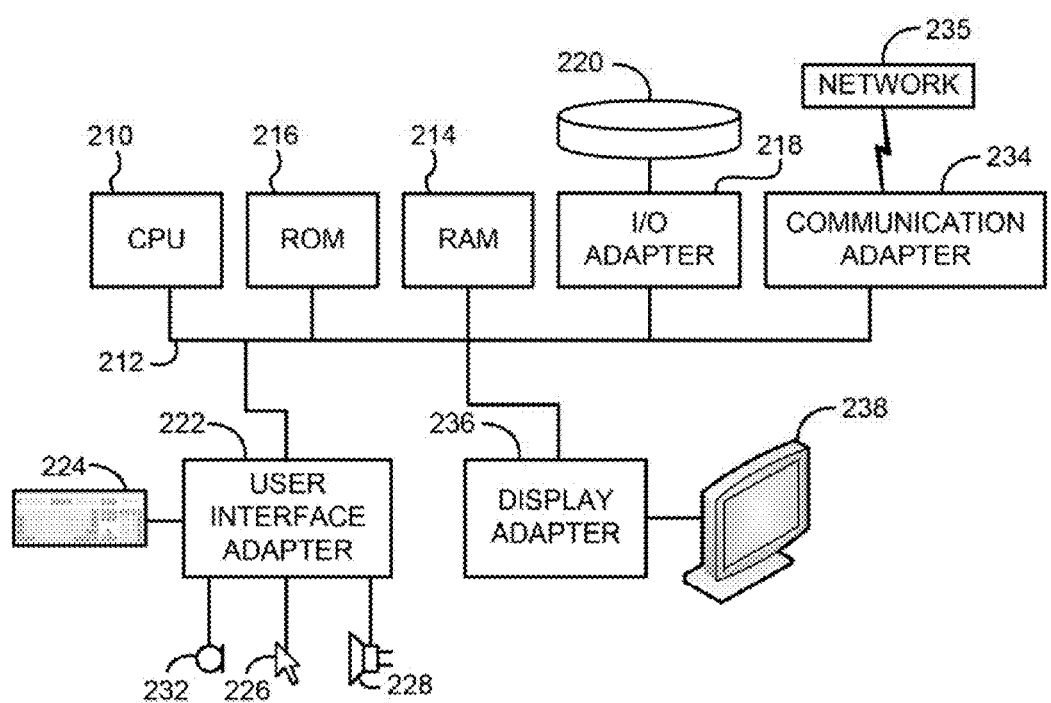
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera not shown) to the bus 212, communication adapter 234 for connecting the workstation to a communication network. 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
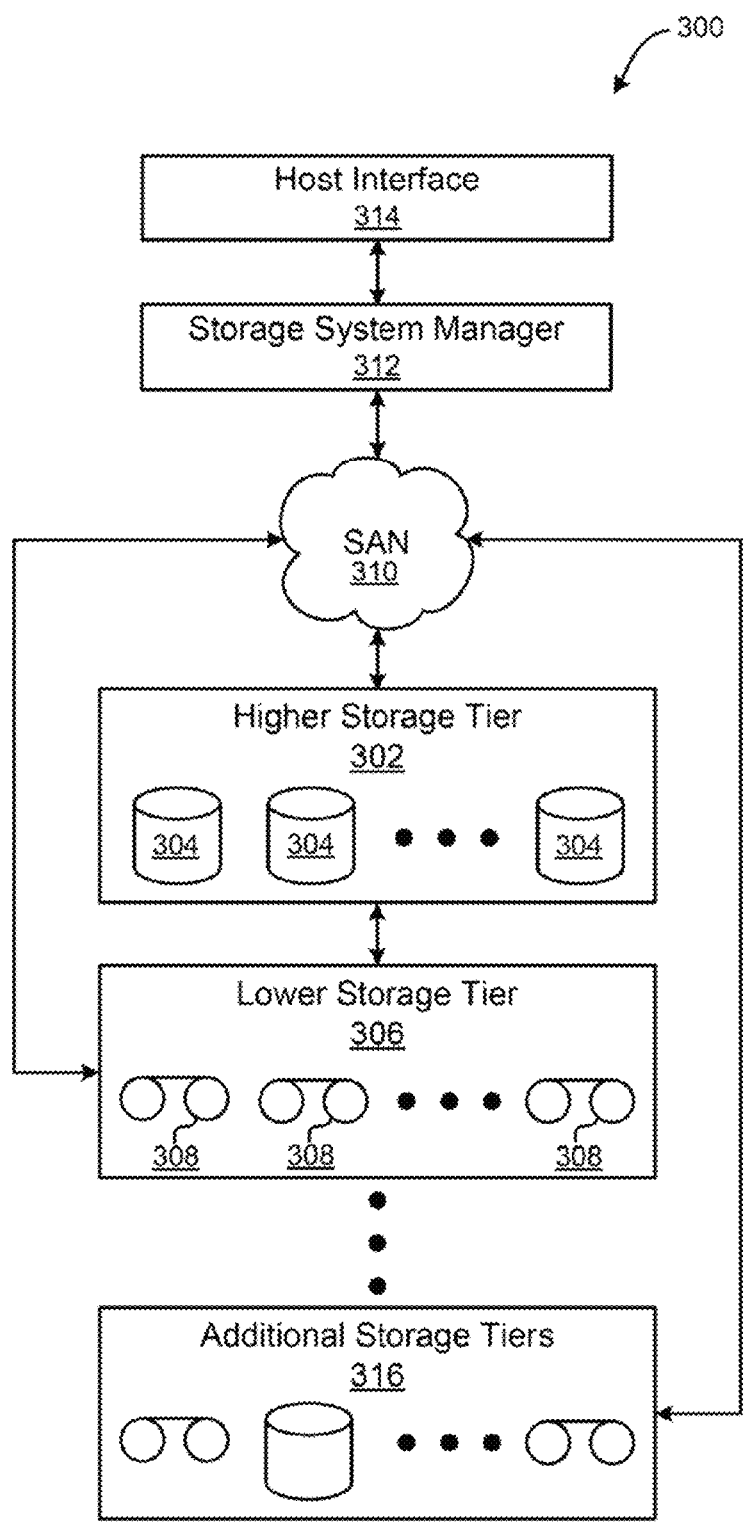
FIG. 3 illustrates a tiered data storage system in accordance with one embodiment.

Now referring to FIG. 3, a tiered storage system 300 is shown according to one embodiment. Note that some of the elements shown in FIG. 3 may be implemented as hardware and/or software, according to various embodiments. The storage system 300 may include a storage system manager 312 for communicating with a plurality of media on a higher storage tier 302 and a lower storage tier 306. The higher storage tier 302 preferably may include one or more random access and/or direct access media 304, such as hard disks in hard disk drives (HDDs), nonvolatile memory (NVM), solid state memory in solid state drives (SSDs), etc., and/or others noted herein. The lower storage tier 306 may preferably include one or more sequential access media 308, such as magnetic tape in tape drives, optical media, etc., and/or others noted herein. Additional storage tiers 316 may include any combination of storage memory media. The storage system manager 312 may communicate with the storage media 304, 308 on the higher and lower storage tiers 302, 306 through a network 310, such as a storage area network (SAN), as shown in FIG. 3. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic adapted to receive a request to open a data set, logic adapted to determine if the requested data set is stored to a lower storage tier 306 of a tiered data storage system 300 in multiple associated portions, logic adapted to move each associated portion of the requested data set to a higher storage tier 302 of the tiered data storage system 300, and logic adapted to assemble the requested data set on the higher storage tier 302 of the tiered data storage system 300 from the associated portions.

Of course, this logic may be implemented as a method on any device and/or system or as a computer program product, according to various embodiments.

For conventional enterprise solutions, improper shutdown of the hardware can have deleterious effects, some as severe as the loss of customer data. Typically, enterprise solutions are built with a tiered architecture that makes something as simple as shutting down the system very complex. These tiered systems must often be taken down in a specific manner to avoid the foregoing deleterious effect; thus, generally only certified human operators perform such tasks. However, human operators may be delayed while customers face disaster scenarios (e.g., earthquakes, floods, fires) or immediate crises (e.g., power outages). Further, said crises or disasters tend to occur unexpectedly, resulting in situations where customers may not have enough time to contact the human operators to shut down their tiered systems to protect such systems from damage.

Similarly, another disastrous scenario may arise where an individual component and/or node within a tiered system reaches a critical state without knowledge of the customer or human operator. For example, when an individual component is exposed to an environment or condition that is not expected (i.e., blocked vents, fan failures, lab cooling failures, power spike, etc.), a failure of the component is possible. Additionally, a node may reach a thermal failure (i.e., the temperature hits a maximum allowable temperature) and shut itself down to prevent further damage to the component. Although error messages may surface as the component shuts down, no mechanism currently exists to ensure the proper shutdown of the complete tiered system. Consequently, the sudden shutdown of the individual component may lead to a loss of customer data, and loss of configuration.

Embodiments of the present invention overcome the aforementioned drawbacks by providing a method, system and computer program product to implement the automated shutdown of a tiered computing system. For example, in cases when a crisis is imminent, a disaster unexpectedly arises, and/or a component autonomously shuts down such that there is no time to contact the human operators, embodiments presented herein provide methodology to properly shut down enterprise solutions. Preferably, various embodiments of the present invention may enable the sequential shutdown of all components of a given system. Additionally, various embodiments may initialize the automatic shutdown procedure for a system before an individual component and/or node reaches a critical state (e.g. a critical temperature), therefore allowing components to shut down in the correct and safe order.

Figure 4:
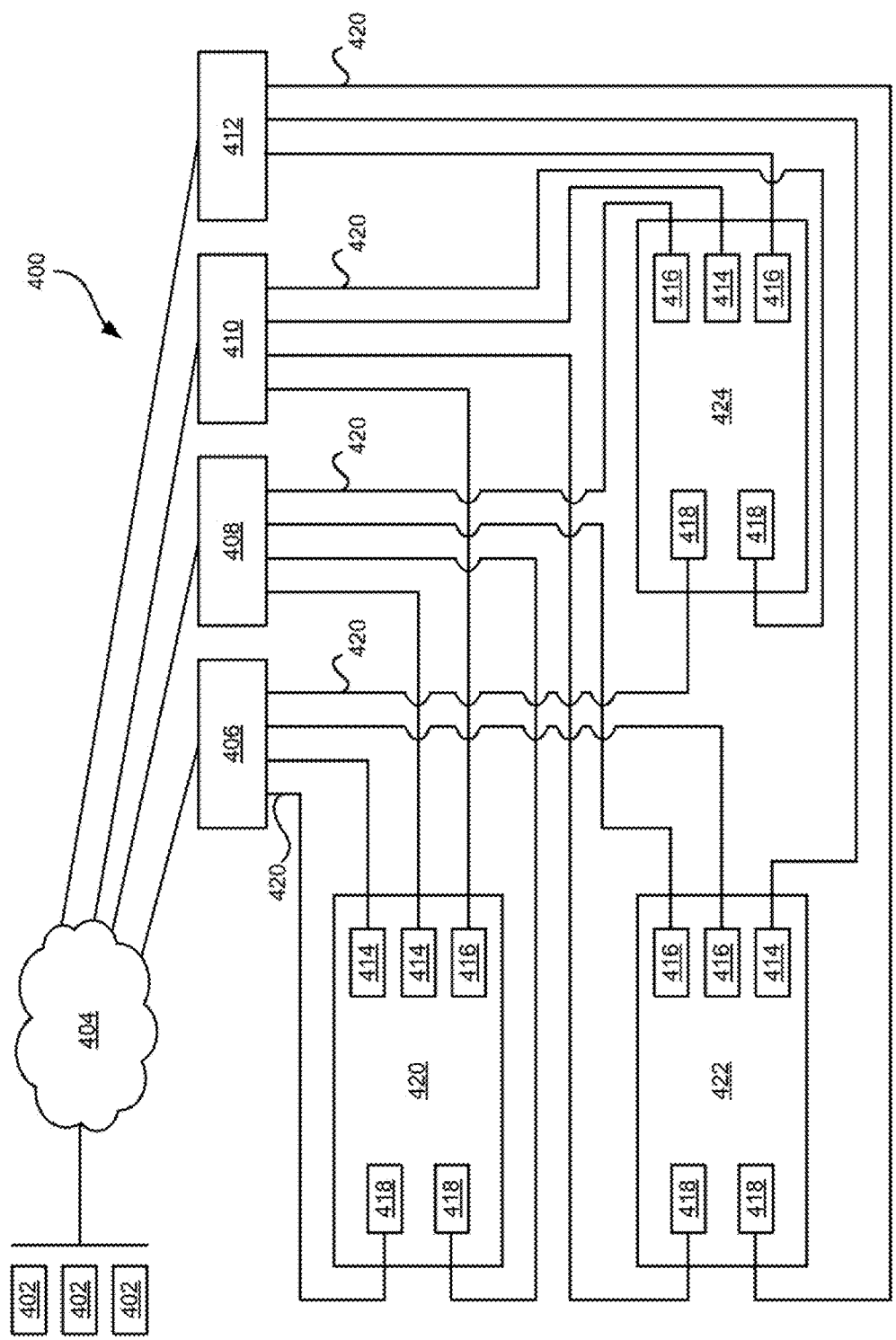
FIG. 4 illustrates a representation of a computing environment, in accordance with one embodiment.

FIG. 4 depicts an illustrative representation 400 of a computing environment in accordance with one embodiment. As an option, the present representation 400 may be implemented in conjunction with features from any other embodiment listed herein, such as those described with reference to the other FIGS. Of course, however, such representation 400 and others presented herein may be used in various applications and/or in permutations, which may or may not be specifically described in the illustrative embodiments listed herein.

As shown in FIG. 4 according to one approach, one or more human operators 402 may send an instruction to one or more hosts 406, 408, 410, 412 to execute a command that instructs one or more systems 414, 416, 418 at one or more sites 420, 422, 424 and in communication with the one or more hosts 406, 408, 410, 412 to execute a script, where the script is for automatically shutting down components of the one or more systems 414, 416, 418 in an order defined by the script.

As used herein, the instruction may be transmitted via a network 404 including, but not limited to, the Internet, a private intranet, a Local Area Network (LAN), a Wide Area Network (WAN), a Virtual Local Area Network (VLAN), etc. In preferred embodiments, the instruction may be transmitted via a fibre channel network.

In one embodiment, the one or more hosts 406, 408, 410, 412 may be located remotely or locally to the one or more human operators 402. In another embodiment, the one or more hosts 406, 408, 410, 412 may be located remotely or locally to the one or more sites 420, 422, 424. Additionally, the one or more hosts 406, 408, 410, 412 may have resident thereon an operating system including, but not limited to, the Microsoft WINDOWS Operating System (OS), a MAC OS, a UNIX OS, etc. In a preferred embodiment, the IBM z/OS operating system may run on the one or more hosts 406, 408, 410, 412.

In various approaches, the one or more hosts may include hardware and software resident thereon, including but not limited to Virtual Storage Extended (VSE), Virtual Processing System (VPS), Linux, Virtual Machine (VM), Multiple Virtual Storage (MVS), etc.

According to yet another embodiment, the one or more hosts 406, 408, 410, 412 may communicate directly with the one or more systems 414, 416, 418 at the one or more sites 420, 422, 424 via one or more fibre channels 420, as shown in FIG. 4. In some approaches, the one or more fibre channels 420 may include various fibre channel topologies, including, but not limited to, Fibre Channel Point-to-point (FC-P2P), Fibre Channel Arbitrated Loop (FC-AL), Fibre Channel Switched Fabric (FB-SW), etc., or any combination thereof. Additionally, in some approaches the one or more hosts 406, 408, 410, 412 may transmit commands, such as a Small Computer System Interface (SCSI) command, a job control language (JCL) command, etc., to the one or more systems 414, 416, 418 at the one or more sites 420, 422, 424 using, for example, the Fibre Channel Protocol (FCP) over the one or more fibre channels 420.

In various approaches, the one or more systems 414, 416, 418 may be connected, at least in part, to the one or more hosts 06, 408, 410, 412 via a unique one of the one or more fibre channels 420. For example, as shown in FIG. 4, two systems 414 and 418 may communicate with the host 406, however each system 414, 418 is connected thereto is a unique fibre channel 420.

According to a further embodiment, the one or more hosts 406, 408, 410, 412 may be in communication with one or more systems 414, 416, 418 at a single site. The one or more hosts 406, 408, 410, 412 may also be in communication with one or more systems 414, 416, 418 located at different sites, according to another embodiment. For example, in one approach, host 406 may be in communication with systems 414 and 418 at site 420, system 416 at site 422, and system 418 at site 424. In another approach, host 408 may be in communication with systems 414 and 418 at site 420, system 416 at site 422, and system 416 at site 424. In yet another approach, host 410 may be in communication with system 416 at site 420, system 418 at site 422, and systems 414 and 418 at site 422. In a further approach, host 412 may be in communication with system 416 at site 424, and systems 414 and 418 at site 422.

As used herein, the one or more systems 414, 416, 418 may include, but are not limited to the IBM TS7700 Virtualization Engine ("Hydra"), the IBM fusion, a control unit, a workstation, a personal computer, a router, a switch, etc., and/or other suitable system as would be understood by one having skill in the art upon reading the present disclosure. The one or more systems 414, 416, 418 located at the one or more sites 420, 422, 424 may all be different types of systems, some similar and some different devices, multiples of certain systems, or any combination thereof. It is important to note that FIG. 4 is not meant to be limiting in any way with regard to the types and/or numbers of systems located at the one or more sites.

In addition, the one or more systems may be connected to and communicate with each other via a network including, but not limited to, the Internet, a private intranet, a Local Area Network (LAN), a Wide Area Network (WAN), a Virtual Local Area Network (VLAN), etc.

Furthermore each of the one or more systems may have a unique identification such that the command may instruct the one or more selected systems at the one or more sites and in communication with the one or more hosts to execute a script for automatic shutdown of the one or more system's components, according to one embodiment. For example, where a system 416 at site 420 is selected for automatic shutdown, an MVS operator 402 may send an instruction to host 410 to execute a command that instructs system 416 at site 420 to execute a script for automatic, shutdown of said system's components, in one approach.

Similarly, in another approach, if one or more systems 414 at site 420 are selected for automatic shutdown, an MVS operator 402 may send an instruction to host 406 and/or host 408 to execute a command that instructs the one or more systems 414 at site 420 to execute a script, for automatic shutdown.

In yet another approach, where all the systems at site 420 are selected for automatic shutdown, an MVS operator 402 may send an instruction to: host 406 to execute a command that instructs systems 414 and 418 to each execute a script for automatic shutdown, host 408 to execute a command that instructs systems 414 and 418 to each execute a script for automatic shutdown, and host 410 to execute a command that instructs system 416 to execute a script for automatic shutdown.

In a further approach, if system 416 at site 420 and system 414 at site 422 are selected for automatic shutdown, an MVS operator 402 may send an instruction to host 410 to execute a command that instructs system 416 at site 420 to execute a script for automatic shutdown and an instruction to host 412 to execute a command that instructs system 414 at site 422 to execute a script for automatic shutdown.

In additional embodiments, one or more human operators 402 may send an instruction to one or more hosts 406, 408, 410, 412 to execute a host console command that determines whether the one or more systems 414, 416, 418 are ready for being shut down in an order defined by the script.

There are numerous combinations for the automatic shutdown of the one or more systems at the one or more sites and in communication with the one or more hosts that may be created based on the embodiments described herein, as would be recognized by one having skill in the art upon reading the present disclosure.

Figure 5:
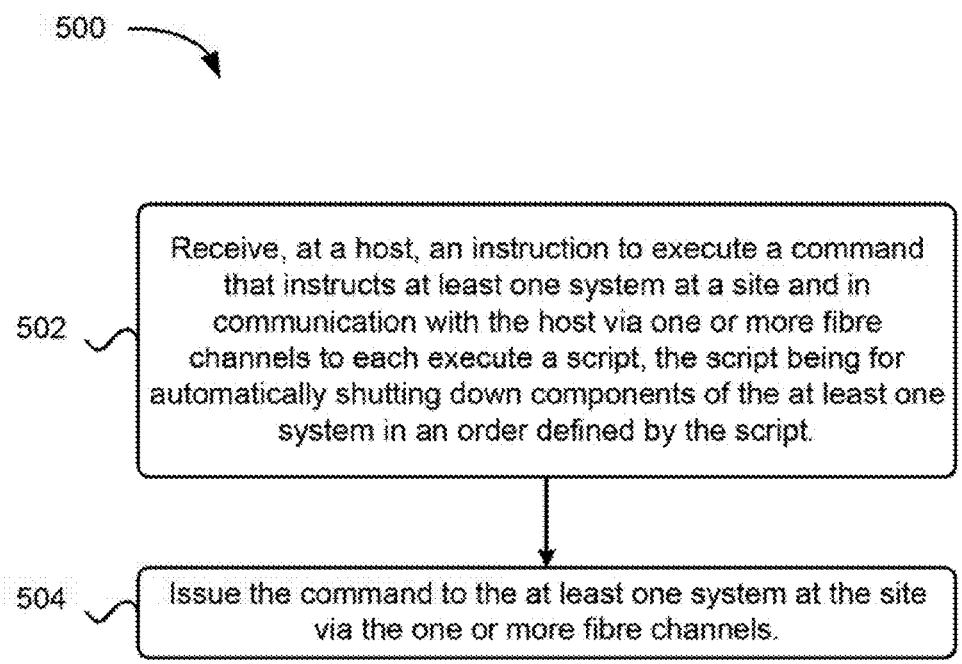
FIG. 5 is a flow diagram of a method, in accordance with one embodiment.

Referring now to FIG. 5, a method 500 for implementing an automated shutdown of a system is shown in accordance with one embodiment. Additionally, as an option, the present method 500 may be implemented in conjunction with features from other embodiments described herein, such as those shown in the other FIGS. Of course, however, this method 500 and others presented herein may be used in various applications and/or permutations, which may or may not be related to the illustrative embodiments listed herein. Further, the methods presented herein may be carried out in an desired environment. Moreover, more or less operations than those shown in FIG. 5 may be included in method 500, according to various embodiments.

As shown in FIG. 5 according to one approach, the method 500 may be performed by one or more hosts. For example, in one embodiment, the method 500 includes receiving, at a host, an instruction to execute a command that instructs at least one system at a site and in communication with the host via one or more fibre channels to each execute a script, the script being for automatically shutting down components of the at least one system in an order defined by the script. See operation 502.

In one embodiment, the instruction may be received from a human operator. In another embodiment, the instruction may be generated in response to a message from the at least one system that a failure of a component of the at least one system is imminent.

The method 500 also includes issuing the command to the at least one system at the site via the one or more fibre channels. See operation 504. As used herein, the command may include, but is not limited to, a job control language (JCL) command or other command as would be understood by one skilled in the art upon reading the present disclosure.

According to one embodiment, the host may communicate directly with the at least one system via the one or more fibre channels. Further, each of the at least one system may be connected to the host, at least in part, via a unique one of the one or more fibre channels, in various approaches. For example, as shown in FIG. 4 according to one approach, two systems 414 and 418 may be in communication with host 406, however each system 414, 418 is connected thereto via a unique fibre channel.

According to one embodiment, the command may instruct at least two systems at the site to each execute the script associated therewith. In another embodiment, the method 500 may also include issuing the command to one or more systems located at one or more different sites to each execute the script associated therewith.

In yet another embodiment, the command may also instruct a second host to execute a second command that instructs at least one other system at the site an in communication with the second host to execute a second script, the script being for automatically shutting down components of the at least one other system in an order defined by the second script. In a further embodiment, the command may also instruct a second host to execute a second command instructs one or more systems located at one or more different sites and in communication with the second host to each execute the script associated therewith.

Additionally, in one embodiment, the command may further move a job running on the at least one system to at least one second system prior to instructing the at least one system to execute the script associated therewith. According to another embodiment, the script associated with the at least one system may further move a job running on the at least one system to at least a second system prior to shutting down the at least one system in an order defined by the script associated therewith. In one approach, the at least one second system may be located at the same site as the at least one system another approach, the at least one second system may be located at another site than the at least one system.

According to another embodiment, the command ma be stored on the host for immediate issuing. Storing the command on host may allow for a rapid response, as the command does not need to be generated. For example, in one approach, one or more commands may be pre-prepared to account for each possible shutdown scenario and subsequently stored on the host for rapid deployment.

According to yet another embodiment, the method 500 may further include executing a host console command for determining whether the at least one system is ready for being shut down in the order defined by the script.

Figure 6:
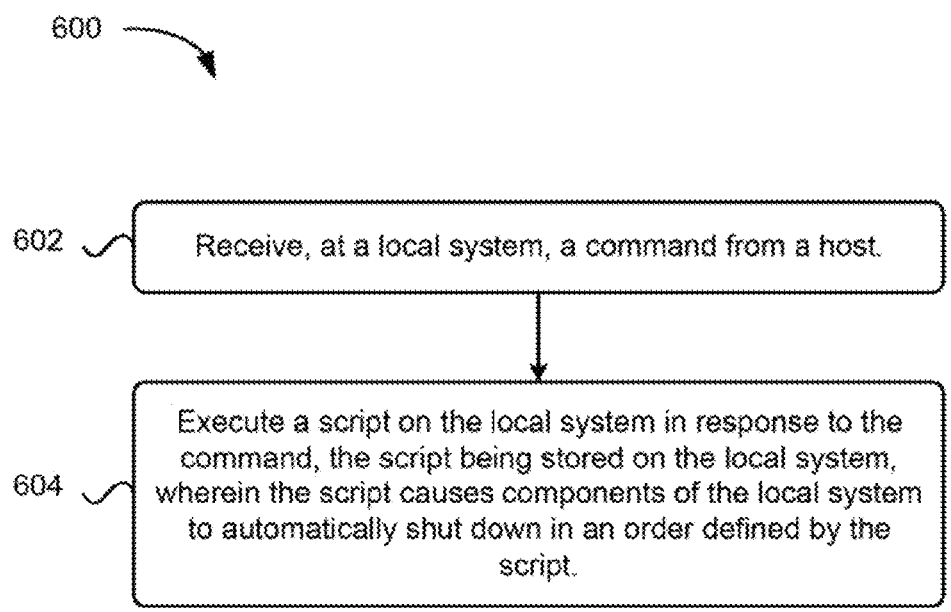
FIG. 6 is a flow diagram of a method, in accordance with one embodiment.

Referring now to FIG. 6, a method 600 for implementing an automated shutdown of a system is shown according to another illustrative embodiment. Additionally, as an option, the present method 600 may be implemented in conjunction with features from other embodiments described herein, such as those shown in the other FIGS. Of course, however, this method 600 and others presented herein may be used in various applications and/or permutations, which may or may not be related to the illustrative embodiments listed herein.

Further, the methods presented herein may be carried out in any desired environment. Moreover, more or less operations than those shown in FIG. 6 may be included in method 600, according to various embodiments.

As shown in FIG. 6 according to one approach, the method 600 may be performed by one or more clients. For example, the method 600 includes receiving, at a local system, a command from a host. See operation 602. As used herein, the local system may include, but is not limited to a workstation, a personal computer, a router, a switch, a server, or other local system as would be understood by one having skill in the art upon reading the present disclosure. In preferred embodiments, the local system may include, but is not limited to an IBM Hydra, an IBM Fusion, a control unit, etc. In on embodiment, the host may be local or remote to the local system.

In one embodiment, the local system may communicate directly with, e.g. receive a command from, the host via the one or more fibre channels. In another embodiment, the local system may be connected to the host, at least in part, via a unique one of the one or more fibre channels.

The method 600 also includes executing a script on the local system in response to the command, the script being stored on the local system, wherein the script causes components of the local system to automatically shut down in an order defined by the script. See operation 604. As used herein, shut down signifies that the component is powered down.

In one embodiment, the components may include a data storage system, a server, a network switch, a disk cache controller, cache expansion frames, etc. In another embodiment, the server may be shut down in a first operation, the network switch may be shut down in a second operation and the data storage may be shut down in a third operation according to the order defined by the script. As used herein, a data storage system may include, but is not limited to, tape drives, disk drives, etc. or other suitable data storage system that would be understood by one having skill in the art upon reading the present disclosure.

In yet another embodiment the method 600 may further comprise sending, a message to the host that a failure of a component of the system is imminent, wherein the command is received in response to the message.

In a further embodiment, the method 600 may further comprise receiving at the local system a host console command for determining whether the local system is ready for being shut down in the order defined by the script.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
receiving, at a host, an instruction to execute a command that instructs at least one system at a site and in communication with the host via one or more fibre channels to each execute a script, the script being for automatically shutting down components of the at least one system in an order defined by the script; and
issuing the command to the at least one system at the site via the one or more fibre channels,
wherein the command also instructs at least one of:
  a) a second host to execute a second command that instructs at least one other system at the site and in communication with the second host to execute a second script, the second script being for automatically shutting down components of the at least one other system in an order defined by the second script,
  b) at least one system at a second site and in communication with the host to execute a second script, the second script being for automatically shutting down components of the at least one system at the second site in an order defined by the second script, and
  c) a second host to execute a second command that instructs at least one system at a second site and in communication with the second host to execute a second script, the second script being for automatically shutting down components of the at least one system at the second site in an order defined by the second script.

2. The method of claim 1, wherein the instruction is received from a human operator, and wherein the command is a job control language command.

3. The method of claim 1, wherein the instruction is generated in response to a message from the at least one system that a failure of a component of the at least one system is imminent.

4. The method of claim 1, wherein the command instructs the second host to execute the second command that instructs the at least one other system at the site and in communication with the second host to execute the second script.

5. The method of claim 1, wherein the command instructs at least two systems at the site and in communication with the host to each execute the script associated therewith.

6. The method of claim 5, wherein each of the at least two systems at the site are in communication with the host via a unique fibre channel.

7. The method of claim 5, wherein the command includes a unique identifier associated with each of the at least two systems.

8. The method of claim 1, wherein the command further moves a job running on the at least one system to at least one second system prior to instructing the at least one system to execute the script associated therewith.

9. The method of claim 1, wherein the command is stored on the host for immediate issuing.

10. The method of claim 1, further comprising executing a host console command for determining whether the at least one system is ready for being shut down in the order defined by the script.

11. The method of claim 1, wherein the command instructs the at least one system at the second site to execute the second script.

12. The method of claim 1, wherein each of the at least one system is connected to the host via a unique one of the one or more fibre channels.

13. The method of claim 1, wherein the at least one system at the site comprises a tiered storage system including a plurality of storage tiers, wherein at least one the storage tiers includes a sequential access storage medium.

14. The method of claim 13, wherein at least one of the storage tiers includes a hard disk drive and/or a solid state drive.

15. The method of claim 1, wherein the command instructs the second host to execute the second command that instructs the at least one system at the second site to execute the second script.

16. A computer-implemented method, comprising:
receiving, at a local system, a command from a host;
executing a script on the local system in response to the command, the script being stored on the local system, wherein the script causes components of the local system to automatically shut down in an order defined by the script,
wherein the command also instructs a second host to execute a second command that instructs at least one other system and in communication with the second host to execute a second script, the second script being for automatically shutting down components of the at least one other system in an order defined by the second script.

17. The method of claim 16, wherein the components include a data storage system, a server, and a network switch, wherein the data storage is shut down in a first operation, the server is shut down in a second operation and the network switch is shut down in a third operation.

18. The method of claim 17, wherein the local system is in communication with the host via a unique fibre channel.

19. The method of claim 16, further comprising sending a message to the host that a failure of a component of the system is imminent, wherein the command is received in response to the message.

20. The method of claim 19, further comprising receiving, at a local system, a host console command from the host, where the host console command is configured to determine whether the local system is ready for being shut down in the order defined by the script.

\* \* \* \* \*